Nov. 5, 1968  D. MARCUSE ET AL  3,409,345
ELECTROMAGNETIC WAVEGUIDING GASEOUS DEVICE WITH HELICAL VANES
Filed April 22, 1965
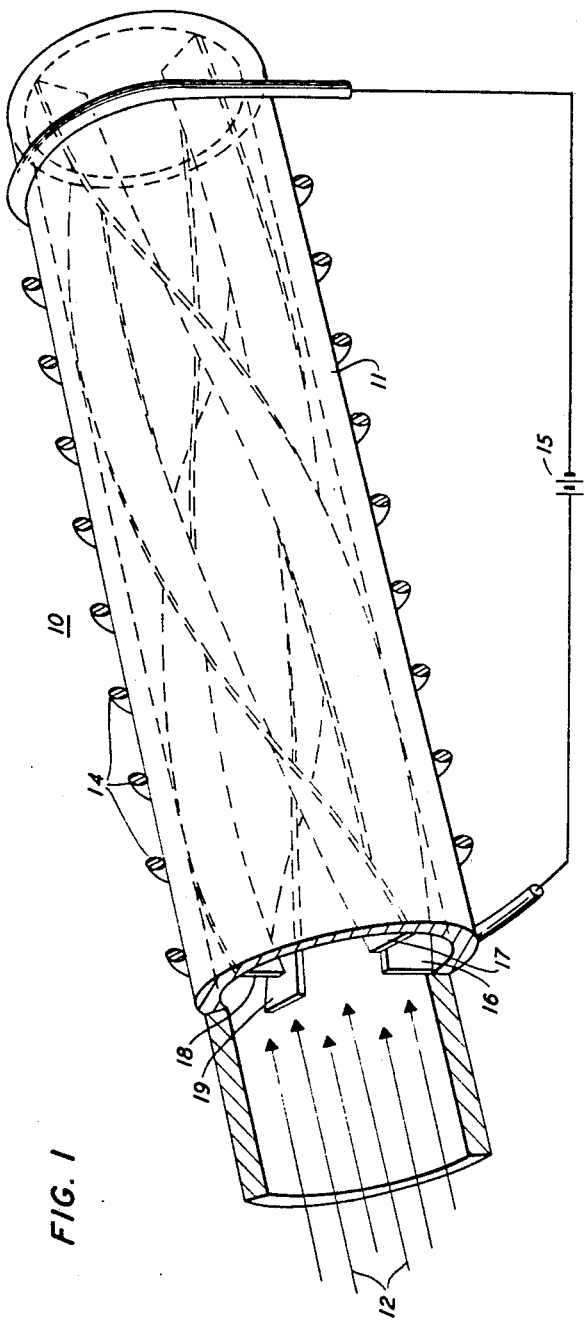
FIG. 1
FIG. 2
FIG. 3
INVENTORS D. MARCUSE
W. H. STEIER
BY
Sylvan Sherman
ATTORNEY

United States Patent Office 3,409,345
Patented Nov. 5, 1968

3,409,345
ELECTROMAGNETIC WAVEGUIDING GASEOUS DEVICE WITH HELICAL VANES
Dietrich Marcuse, Lincroft, and William H. Steier, Middletown, N.J., assignors to Bell Telephone Laboratories, Incorporated, New York, N.Y., a corporation of New York
Filed Apr. 22, 1965, Ser. No. 450,121
3 Claims. (Cl. 350—179)

ABSTRACT OF THE DISCLOSURE

To minimize the effect of gravity upon the rotational symmetry of a gas lens used to guide electromagnetic wave energy, a helical motion is imparted to the flowing gas. In the embodiment described, helical vanes, attached to the inner surface of the gas-enclosing conduit are used. To avoid disturbing the radial temperature gradient in thermal gas lenses, the vanes are preferably made of heat insulating material.

This invention relates to gaseous lenses and gaseous transmission media and, in particular, to means for maintaining circular symmetry in such devices.

In the copending applications by D. W. Berreman, Ser. No. 347,166, filed Feb. 25, 1964; Ser. No. 372,992 filed June 5, 1964; Ser. No. 385,739, filed July 28, 1964; Ser. No. 402,170, filed Oct. 7, 1964, now Patent No. 3,355,235, issued Nov. 28, 1967; by D. W. Berreman and S. E. Miller, Ser. No. 379,175, filed June 30, 1964; by K. B. McAfee, Jr., Ser. No. 357,424, filed Apr. 6, 1964; by A. C. Beck, G. E. Conklin and A. R. Hutson, Ser. No. 379,112, filed June 30, 1964; by G. E. Conklin, Ser. No. 397,678, filed Sept. 21, 1964; all of which are assigned to applicants' assignee, there are described various types of gaseous lenses and gaseous transmission media particularly adapted for the transmission of optical wave energy. It is a characteristic of the devices described in the above-mentioned copending applications, that a refractive index gradient is established across the wavepath as a means for controlling the optical wave energy propagating therethrough.

Basically there are two types of gaseous waveguiding devices. In one type, a radial thermal gradient is established in the gas within the wavepath. This results in a variation in the refractive index across the wavepath which tends to focus the wave energy and to maintain a collimated beam.

The second type of gaseous device utilizes two or more gases of different refractive indices, injected simultaneously into the optical wavepath, to produce the desired radially varying index of refraction across the wavepath.

To operate properly, both types of gaseous waveguiding devices require a fair degree of circular symmetry. However, gravitational effects tend to distort this symmetry by deforming the lines of constant density. It is well known that in a fluid environment, convection currents are created when the heavier fluids settle, forcing the lighter fluids to rise. This effect is evident in gaseous waveguiding devices, as the differences in density between different gases, or between the same gas at different temperatures, produces convection currents which distort the symmetry of the devices.

It is, accordingly, the broad object of this invention to maintain substantially circular symmetry in gaseous transmission devices.

In accordance with the invention, gravitational effects in gaseous transmission devices are reduced by imparting a helical motion to the gas.

In a preferred embodiment of the invention, helical vanes, inserted along the inner surface of the waveguiding enclosure, are employed to impart a helical motion to the gas. The vanes, which are of nominal thickness, advantageously extend as far into the gas as possible without interfering with the transmission of the optical wave energy. Generally the vanes can be made of any suitable material. In a thermal gaseous system, however, the vanes are preferably made of a heat insulating material so as not to disturb the temperature gradient.

These and other objects and advantages, the nature of the present invention, and its various features, will appear more fully upon consideration of the various illustrative embodiments now to be described in detail in connection with the accompanying drawings, in which:

FIG. 1 is an illustrative embodiment of the invention as employed in a thermal gaseous lens;

FIG. 2 shows a Mach Zehnder interference pattern in a prior art thermal gaseous lens; and FIG. 3 shows a Mach Zehnder interference pattern in a thermal gaseous lens in accordance with the present invention.

Referring to FIG. 1, there is shown a portion of an optical transmission guide 10 comprising a hollow tube 11, within which a gas flow, indicated by the arrows 12, has been established. Means for introducing the gas, and regulating its input pressure and temperature, including filters, compressors, heating and/or cooling means, all of conventional forms, though not shown, are normally included in systems of the type contemplated, as is well known to those skilled in the art.

As described previously, the gas in tube 11 can comprise either a single gas across which a radial thermal gradient is established, or a laminar flow of two or more gases of different refractive indices and densities. Various means for establishing either of these gas flows are described in the copending applications noted above and incorporated herein by reference.

For purposes of illustration a thermal gaseous lens is illustrated in which a transverse thermal gradient is established in the gas by means of heating elements 14 wrapped around tube 11. The heating elements can be piping, circulating a hot fluid, or, as illustrated, comprise a resistive winding connected to a direct current source 15.

To minimize the deleterious effects produced by gravity, which would tend to draw the cooler, and thus heavier, gas at the center of the wavepath down towards the bottom of tube 11, thin helical vanes 16, 17, 18 and 19 are attached to the inner wall of tube 11. Each vane extends radially into the tube advantageously as much as possible without substantially interfering with the optical beam propagating therethrough, and extends longitudinally along the tube. In a thermal system such as the one illustrated, the vanes are preferably made of a heat insulating material so as not to disturb the thermal gradient established by the heating elements 14. In a two-gas system, not dependent on a thermal gradient on the other hand, the vanes can be made of any suitable material.

In one illustrative embodiment, constructed in accordance with the teachings of this invention, a 0.250 inch diameter metal pipe was equipped with two paper vanes of nominal thickness. Each vane extended $\frac{1}{16}$ of an inch into the tube and had a pitch of one turn every four inches. The tube, which was four inches long, was heated electrically to produce a thermal gradient.

The effectiveness of the vanes in reducing convection current and, hence, the convection aberrations of the gas lens can be seen by comparing FIGS. 2 and 3. Both are Mach Zehnder interference patterns made when light, focused by the lens, is mixed with a reference plane wave of light. In both cases the lens had a wall temperature of 100 degrees centigrade and used $CO_2$ gas at a 1.0 lit./min. flow rate and a 23 degree centigrade input temperature.

In the absence of convection currents, the light rings produced would be circles, concentric with the center of the tube. FIG. 2 shows the pattern obtained with a lens with no vanes. As can be seen, the interference rings are pushed downward due to the effect of gravity. FIG. 3 shows the pattern obtained with a lens with vanes. In this case, the rings are much more concentric with the tube center, indicating a reduction in the distortion due to gravity.

Some of the distortion produced in the pattern shown in FIG. 3 is due to turbulence produced when the flowing gas first encounters the vanes. Such distortion can be substantially reduced by increasing the number of vanes and by tapering the dimensions of the vanes at their input and output ends. Thus, in all cases it is understood that the above-described arrangement is illustrative of only one of the many possible specific embodiments which can represent applications of the principles of the invention. Numerous and varied other arrangements can readily be devised in accordance with these principles by those skilled in the art without departing from the spirit and scope of the invention.

What is claimed is:

1. In an electromagnetic wave transmission system, a gaseous wavepath for guiding electromagnetic wave energy comprising:

a hollow, elongated tube including therein a longitunally flowing gas;

means for establishing a radial density gradient within said gas;

and means within said tube extending along the direction of gas flow for imparting a helical motion to said gas as it flows through said tube.

2. The wavepath according to claim 1 wherein said means for imparting a helical motion to said gas comprises a plurality of helical vanes attached to the inner surface of said tube.

3. The arrangement according to claim 1 wherein;

heating means are used to establish said density gradient;

and wherein said vanes are made of a thermal insulating material.

References Cited

UNITED STATES PATENTS 3,355,235  11/1967  Berreman _____ 350—180

OTHER REFERENCES

Beck, "Thermal Gas Lens Measurements," The Bell System Technical Journal, Vol. XLIII, No. 4, part 2, July 1964, pp. 1818–1820.

JOHN K. CORBIN, *Primary Examiner.*